(12) United States Patent
Castillo et al.

(10) Patent No.: US 7,533,289 B1
(45) Date of Patent: May 12, 2009

(54) SYSTEM, METHOD, AND COMPUTER PROGRAM PRODUCT FOR PERFORMING LIVE CLONING

(75) Inventors: Claris Castillo, White Plains, NY (US); Arun K. Iyengar, Yorktown Heights, NY (US); Amol P. Nayate, Elmsford, NY (US); Malgorzata Steinder, Leonia, NJ (US); Ian N. Whalley, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/134,590

(22) Filed: Jun. 6, 2008

(51) Int. Cl.
    *G06F 11/00* (2006.01)
(52) U.S. Cl. .............................. 714/4; 714/15
(58) Field of Classification Search .............. 714/4, 714/15
    See application file for complete search history.

(56) References Cited

U.S. PATENT DOCUMENTS

| 5,513,314 | A  | * | 4/1996  | Kandasamy et al. ........... 714/6 |
| 5,799,141 | A  | * | 8/1998  | Galipeau et al. .............. 714/13 |
| 5,852,724 | A  | * | 12/1998 | Glenn et al. ................. 709/239 |
| 6,091,731 | A  | * | 7/2000  | Biegaj et al. ............. 370/235.1 |
| 6,625,751 | B1 | * | 9/2003  | Starovic et al. ............... 714/11 |
| 6,981,008 | B2 | * | 12/2005 | Tabuchi et al. .............. 707/204 |
| 7,093,086 | B1 | * | 8/2006  | van Rietschote ........... 711/161 |
| 7,152,078 | B2 | * | 12/2006 | Yamagami ................. 707/204 |
| 7,185,169 | B2 | * | 2/2007  | Biessener et al. ........... 711/202 |
| 7,373,390 | B2 | * | 5/2008  | Tabuchi et al. .............. 709/211 |
| 2002/0049925 | A1 | * | 4/2002 | Galipeau et al. ............... 714/6 |
| 2005/0108407 | A1 |   | 5/2005 | Johnson et al. |
| 2005/0278338 | A1 | * | 12/2005 | Todorova et al. .............. 707/10 |
| 2007/0074208 | A1 | * | 3/2007 | Ling et al. ...................... 718/1 |

* cited by examiner

*Primary Examiner*—Bryce P Bonzo
(74) *Attorney, Agent, or Firm*—Cantor Colburn LLP; Joseph Jones

(57) ABSTRACT

A method for cloning a running component from a first machine to a second machine is provided. The method includes: iteratively coping a state of the running component from the first machine to the second machine to generate a copy of the running component on the second machine; assigning the copy of the running component on the second machine an external address that is distinct from an internal address; and mapping communications to and from the copy of the running component based on the distinct external address and the internal address.

2 Claims, 6 Drawing Sheets

SYSTEM, METHOD, AND COMPUTER PROGRAM PRODUCT FOR PERFORMING LIVE CLONING

BACKGROUND

1. Field

This invention relates to systems, methods, and computer program products for performing live cloning of running systems.

2. Description of Background

Replication is a common technique used to mask system failures and to provide high system availability. Replication utilizes redundant resources to ensure that when any component of a service fails, another component can replace the failed one to mask the failure in the system. Traditional approaches to replication provided means for replicating only data. Modern data centers replicate both code and data to ensure that a given service remains available even when one running instance of that service fails.

To support such a design, an instance of a service must have the ability to properly resume operation once it has crashed and been restarted. For example, when a given instance of the service fails (e.g. due to failure of the hardware on which the service was running) other instances of the service continue to service requests and modify their state. When the failed service instance is restarted, the service acquires the same state as the other running instance before it can resume servicing client requests.

SUMMARY

The shortcomings of the prior art are overcome and additional advantages are provided through the provision of a method for cloning a running component from a first machine to a second machine. The method includes: iteratively coping a state of the running component from the first machine to the second machine to generate a copy of the running component on the second machine; assigning the copy of the running component on the second machine an external address that is distinct from an internal address; and mapping communications to and from the copy of the running component based on the distinct external address and the internal address.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically the creation of the new instance of the service is (1) spontaneous—i.e. it can be invoked at any time, (2) non-disruptive—i.e. it only requires pausing one service instance, and only for a short duration of time and (3) transparent—i.e. it does not require any additional application support. Additionally, the creation of new replicas can be dynamically allowed, rather than simply bootstrapping an existing, failed service without modification.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings.

The detailed description explains the preferred embodiments of the invention, together with advantages and features, by way of example with reference to the drawings.

DETAILED DESCRIPTION

In an exemplary embodiment, the present invention provides systems, methods, and computer program products that bootstrap a new instance of a service by creating a replica of an existing instance of the service. The new instance is created without either stopping the running instance or requiring any additional application support.

In one example, the service is a virtual machine. The systems, methods, and computer program products bootstrap a new virtual machine by creating a replica of an existing virtual machine using at each physical machine: a sector-transfer mechanism that iteratively copies bytes from a running virtual machine to the desired destination machine, a page-transfer mechanism that iteratively copies bytes from a running virtual machine to the desired destination machine, and a translation mechanism that allows the virtual machine and its clone to have different representations on the network but continue to use the same representation internally.

Figure 1:
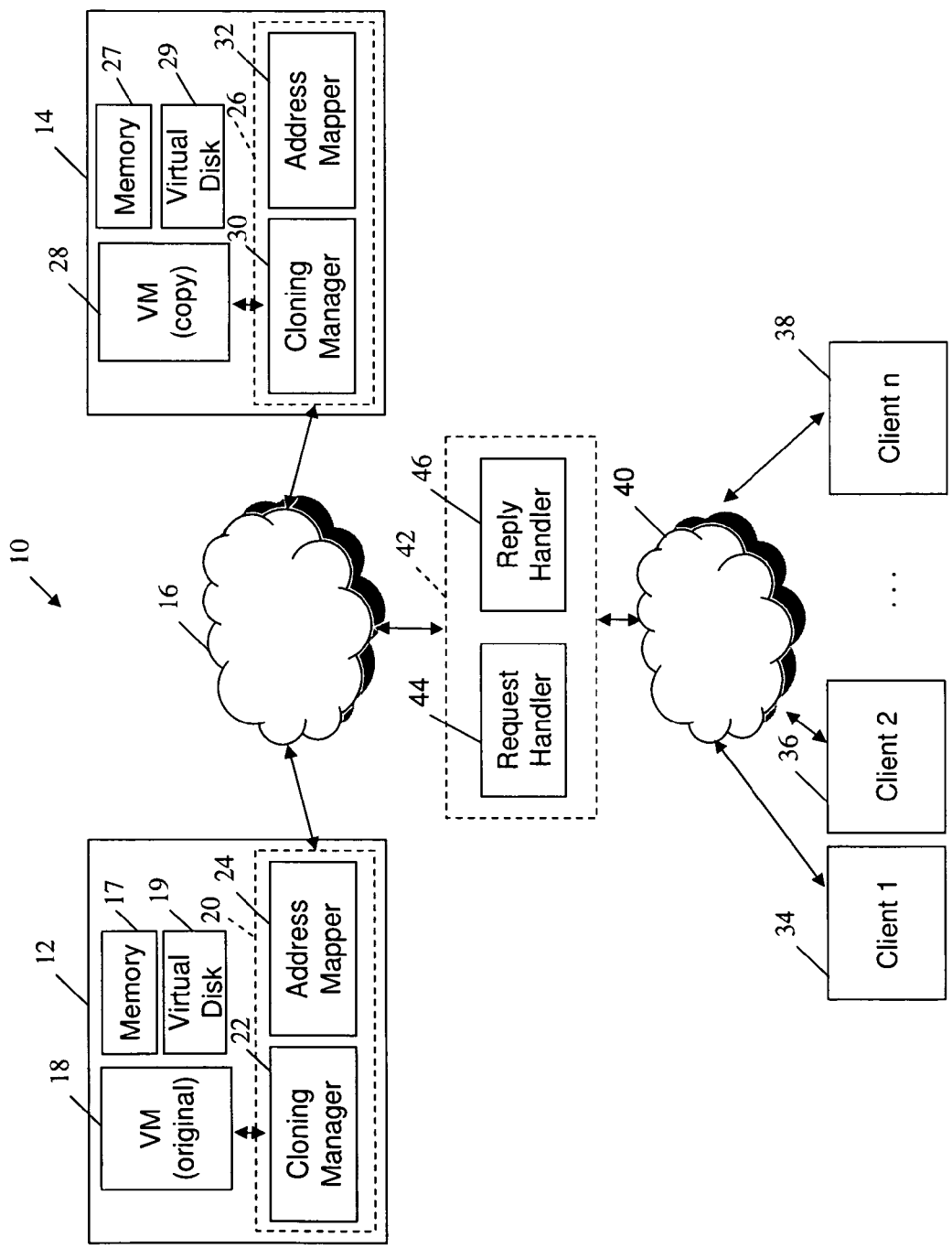
FIG. 1 is a block diagram illustrating a live cloning system in accordance with an exemplary embodiment.

Turning now to the drawings in greater detail, FIG. 1 illustrates a live cloning system 10 in accordance with an exemplary embodiment. The live cloning system 10 includes at least two physical machines, hereinafter referred to as a source machine 12 and a destination machine 14. The source machine 12 and the destination machine 14 are communicatively coupled via a network 16. As can be appreciated, the source machine 12 and the destination machine 14 can be, but are not limited to, a server, a desktop computer, a laptop, and/or any other electronic device that includes memory and a processor.

The source machine 12 includes a component 18. The component 18 can be any software application that communicates with one or more other machines, for example, a software application implemented according to a client-server architecture. For exemplary purposes, the disclosure will be discussed in the context of the component 18 being a service provider, such as a virtual machine (VM) that can be placed on and dynamically moved to any host that contains adequate physical resources to support the virtual machine. The component 18 can be stored to and can communicate data to and from memory 17 and a virtual disk 19.

The source machine 12 further includes a component manager 20 that manages the instance of the component 18 and can include a cloning manager 22 and an address mapper 24. Generally speaking, the cloning manager 22 copies the component 18 (hereinafter referred to as the original component 18) to the destination machine 14. The address mapper 24 manages outgoing and incoming data from the network 16 to the original component 18.

Similarly, the destination machine 14 includes a component manager 26 that manages the instance of a copy of the component (hereinafter referred to as the copy component 28) memory 27, and a virtual disk 29, and can include a cloning manager 30 and an address mapper 32. Generally speaking, the cloning manager 30 helps facilitate the copying of the original component 18 and the data stored in memory 17 and the virtual disk 19 to the destination machine 14. The address mapper 32 manages outgoing and incoming data from the network 16 to the copy of the component 28 while the original component 18 and the copy component 28 are running simultaneously.

In the case of the components 18 and 28 being virtual machines, the component managers 20 and 26 can be implemented as hypervisors. The hypervisors then include the cloning managers 22 and 30 respectively and the address mappers 24 and 32 respectively as one or more layers of abstraction.

One or more other machines (hereinafter referred to as clients 34-38) can communicate service requests to the original component 18 or the copy component 28 via a network 40. A communication handler 42 resides on the networks 16 and 40 and handles the communications between the clients 34-38 and the original component 18 and the copy component 28.

The communication handler 42 includes a request handler 44 and a reply handler 46. The request handler 44 provides a single-server view to the clients 34-38 by intercepting all incoming requests from the clients 34-38 and by generating the request to both the original component 18 and the copy component 28. Similarly, the reply handler 46 provides a single-server view to the clients 34-38 by intercepting all outgoing replies or messages from the original component 18 and the copy component 28 and by generating a single message or reply to the requesting clients 34-38.

Figure 2:
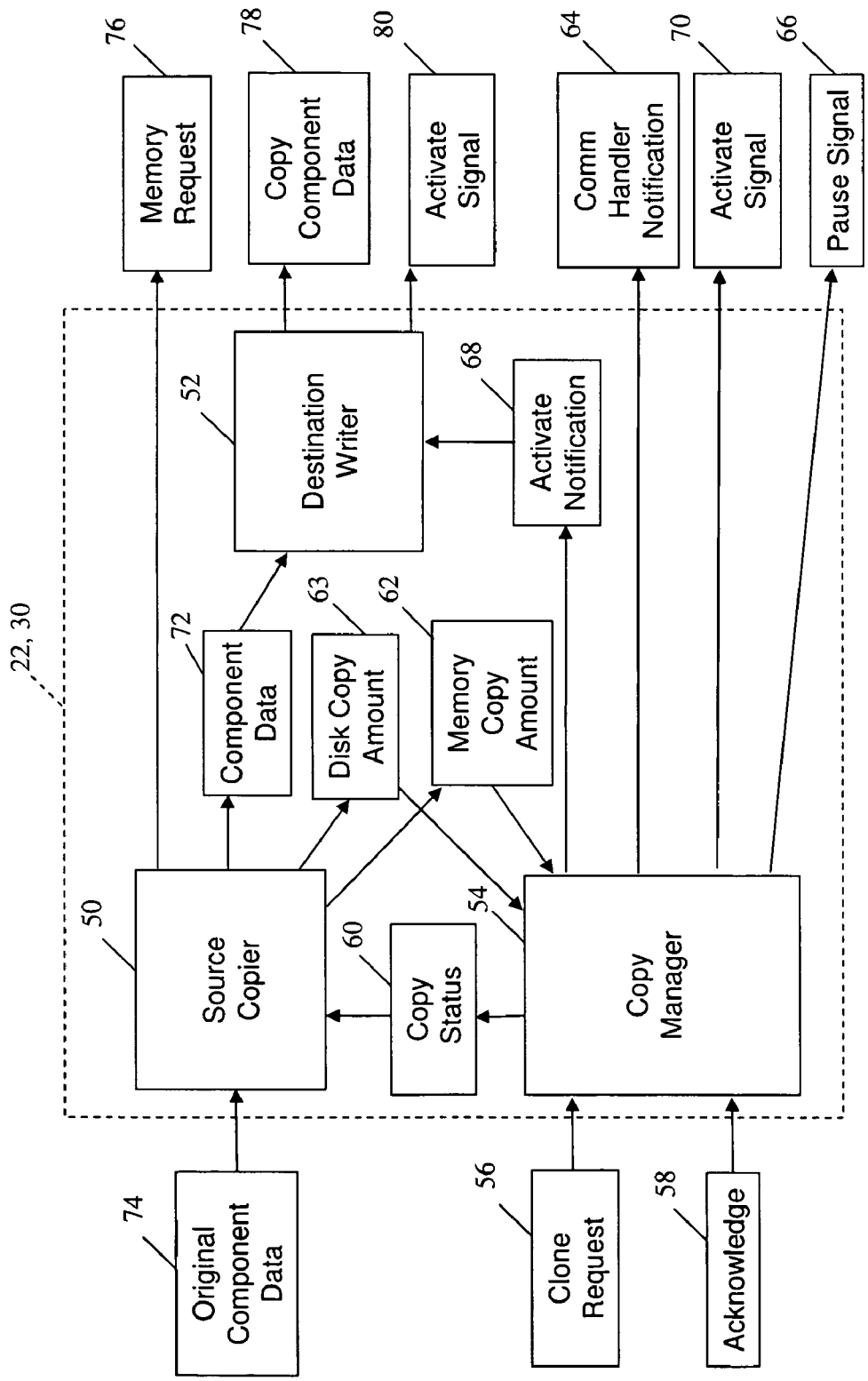
FIG. 2 is a block diagram illustrating a cloning manager of the live cloning system in accordance with an exemplary embodiment.

Turning now to FIG. 2, the cloning manager 22 and 30 are shown as a single manager in accordance with an exemplary embodiment. As can be appreciated, one or more functions of the cloning manager may be partitioned into separate cloning managers 22 and 30, for example, according to a client-server relationship.

As shown, the cloning managers 22, 30 include a source copier 50, a destination writer 52, and a copy manager 54. The copy manager 54 manages the activation of the copying by the source copier 50 based on a clone request 56 and acknowledgements 58 from the communication handler 42 (FIG. 1) (as will be discussed in more detail below). The copy manager 54 manages the activation of the copying by way of setting a copy status 60. The copy status 60 can be set to indicate one of: activate virtual disk copying, activate memory copying, copy remaining data, and stop copying.

In one example, the copy manager 54 sets the copy status 60 to indicate activate virtual disk copying when the clone request 56 is received. In another example, the copy manager 54 monitors a disk copy amount 62 of the virtual disk of the component that has been copied. When the virtual disk has finished copying, the copy manager 54 sets the copy status 60 to indicate activate memory copying. In yet another example, the copy manager 54 monitors a memory copy amount 63 indicating the amount of memory that has been copied. When the amount left to copy is less than a threshold amount, the copy manager 54 sends a notification signal 64 to the communication handler 42 (FIG. 1) indicating that the original component 18 (FIG. 1) will be taken off line and waits for the acknowledgement 58 from the communication handler 42 (FIG. 1) before sending a pause signal 66 to the original component 18 (FIG. 1). Once the pause signal 66 is sent, the copy manager 54 sets the copy status 60 to indicate copy remaining data. Once the memory copy amount 63 indicates that the copy is complete, the copy manager 54 sends an activate notification 68 to activate the copy component 28 (FIG. 1) and sends an activate signal 70 to re-activate the original component 18 (FIG. 1).

The source copier 50 generates a copy of component data 72 from the original component data 74 based on the copy status 60. In one example, based on the copy status 60, the source copier 50 generates a memory request 76 to the destination machine 14 (FIG. 1) to reserve enough resources to host an instance of the copy component 28 on the destination machine 14. The source copier 50 then generates the component data 72 from the original component data 74 by tracking all states used by the original component 18 (e.g., first disk, and then memory and disk) as a set of consecutive fragments (e.g., pages) and by iteratively sending the consecutive fragments as the component data 72. For example, the source copier disk-copy can mirror all modifications occurring at the local disk to the disk at the destination while simultaneously sending unsent segments of the local disk to the destination. After which, the memory-copy operation can proceed in rounds, where the source copier 50 sends all fragments modified in a given round to the destination writer 52 during a next round. If the copy status 60 indicates to stop the fragment iterations, the source copier 50 interrupts the iterations. If the copy status 60 indicates to copy remaining data, the source copier 50 resumes the fragment iterations for all remaining dirty pages.

The destination writer 52 writes copy component data 78 to the destination machine 14 (FIG. 1) based on the component data 72 received. Once the writing is complete and based on the activate notification 68, the destination writer 52 sends an activate signal 80 to the copy component 28 (FIG. 1) to activate the copy component 28 (FIG. 1).

Figure 3:
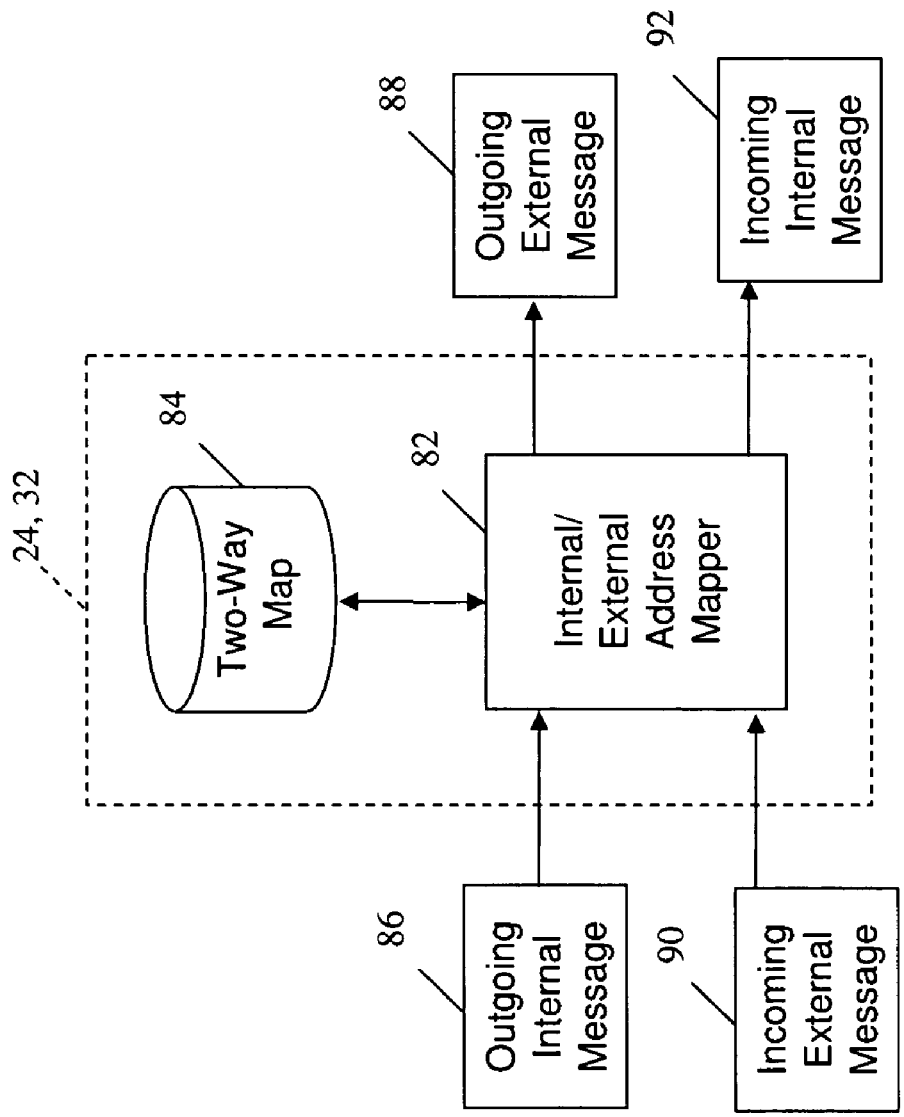
FIG. 3 is a block diagram illustrating an address mapper of the live cloning system in accordance with an exemplary embodiment.

Turning now to FIG. 3, the address mappers 24 and 32 are shown in accordance with an exemplary embodiment. The address mappers 24, 32 include an internal/external address mapper 82 and a two-way map datastore 84. As can be appreciated, the functions of the address mappers 24, 32 can be combined and/or further partitioned to similarly map internal and external communications.

The two-way map datastore 84 stores a two-way mapping between an internal address and an external address of the original component 18 (FIG. 1) in the case of the address mapper 24 (FIG. 1) and the internal and external address of the copy component 28 (FIG. 1) in the case of the address mapper 32 (FIG. 1). Based on the two-way mapping, the internal/external address mapper 82 searches for outgoing internal message data 86 with the known internal representations and replaces the data with the appropriate external representations and generates outgoing external message data 88. The internal/external address mapper 82 searches for incoming external message data 90 with a known external representation and replaces the incoming data with data that includes the appropriate internal representations and generates incoming internal message data 92.

In one example, the internal/external address mapper 82 is a network address translator (NAT). In this example, the internal/external address mapper 82 replaces the external address for incoming network data with the internal address, and replaces the internal address for outgoing network data with the external address, as follows:

On arrival of packet p at a machine:
    If p.destination ∈ {Known External representations}
        Create new packet q as a copy of packet p
        q.destination=externalToInternal(p.destination)
        Process packet q
    Else
        Process packet p
On departure of packet p at a machine:
    If p.source ∈{Known Internal representations}
        Create a new packet q as a copy of packet p
        q.source=internalToExternal(p.source)
        Process packet q
    Else
        Process packet p In the example above, source refers to the network representation of the entity that generated the network data and destination refers to the network representation of the entity for which the data is destined. Two methods are assumed, externalToInternal and internalToExternal, that map between internal and external network representations.

In another example, the internal/external address mapper 82 is an IP tunnel. In this example, the internal/external address mapper 82 receives each network packet contained inside other network packets. Such an implementation is useful when the system is used in conjunction with a front-end that can tunnel requests and a back-end that can recover tunneled replies. The method proceeds as follows:

On arrival of packet p at a machine:
    Create new packet q as a copy of packet p.payload
    Process packet q
On departure of packet p at a machine:
    Create a new packet q
    Copy p into q.payload
    q.source=internalToExternal(p.source)
    q.destination=Representation of back-end
    Process packet q In this example, source, destination and internalToExternal are the same as discussed above. The term payload refers to the actual data contained in a network packet. It is assumed that the internal/external address mapper 82 has knowledge of where to forward the packets; such a destination can be decided a-priori (e.g., via the back-end) or it can be inferred by sending all replies back to the sender that sent the original tunneled packets.

Figure 4:
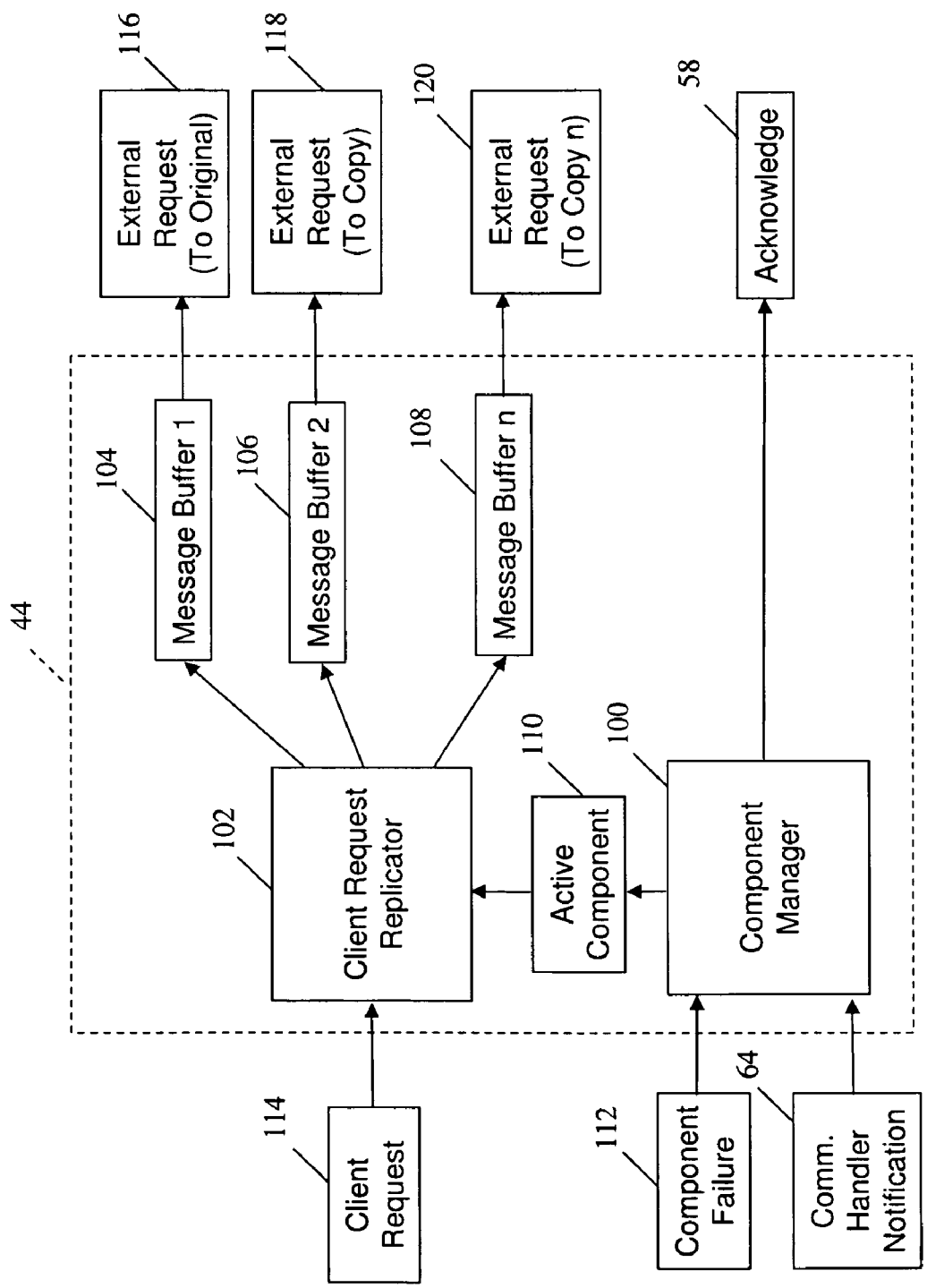
FIG. 4 is a block diagram illustrating a request handler of the live cloning system in accordance with an exemplary embodiment.

Turning now to FIG. 4, the request handler 44 is shown in accordance with an exemplary embodiment. The request handler 44 includes a component manager 100, a request replicator 102, and one or more message buffers 104-108. As can be appreciated, the functions of the request handler 44 can be combined and/or further partitioned to similarly handle all communicated requests.

As shown, the component manager 44 determines active components 110 on the network 16 (FIG. 1) based on the communication handler notifications 64 and any component failure notifications 112. The component manager 100 generates the acknowledgment 58 based on the received communication handler notice 64.

Based on the active components 110, the client request replicator 102 creates a corresponding message buffer 104-108 for each active component. The message buffer 104-108 stores all outgoing network data for the corresponding component. The client request replicator 102 replicates all received client requests 114 and stores the client requests 114 to each message buffer 104-108. The replicated client requests 116-120 of each message buffer 104-108 are then forwarded to the corresponding component address mapper 24, 32 (FIG. 1) (as will be discussed in more detail below).

Figure 5:
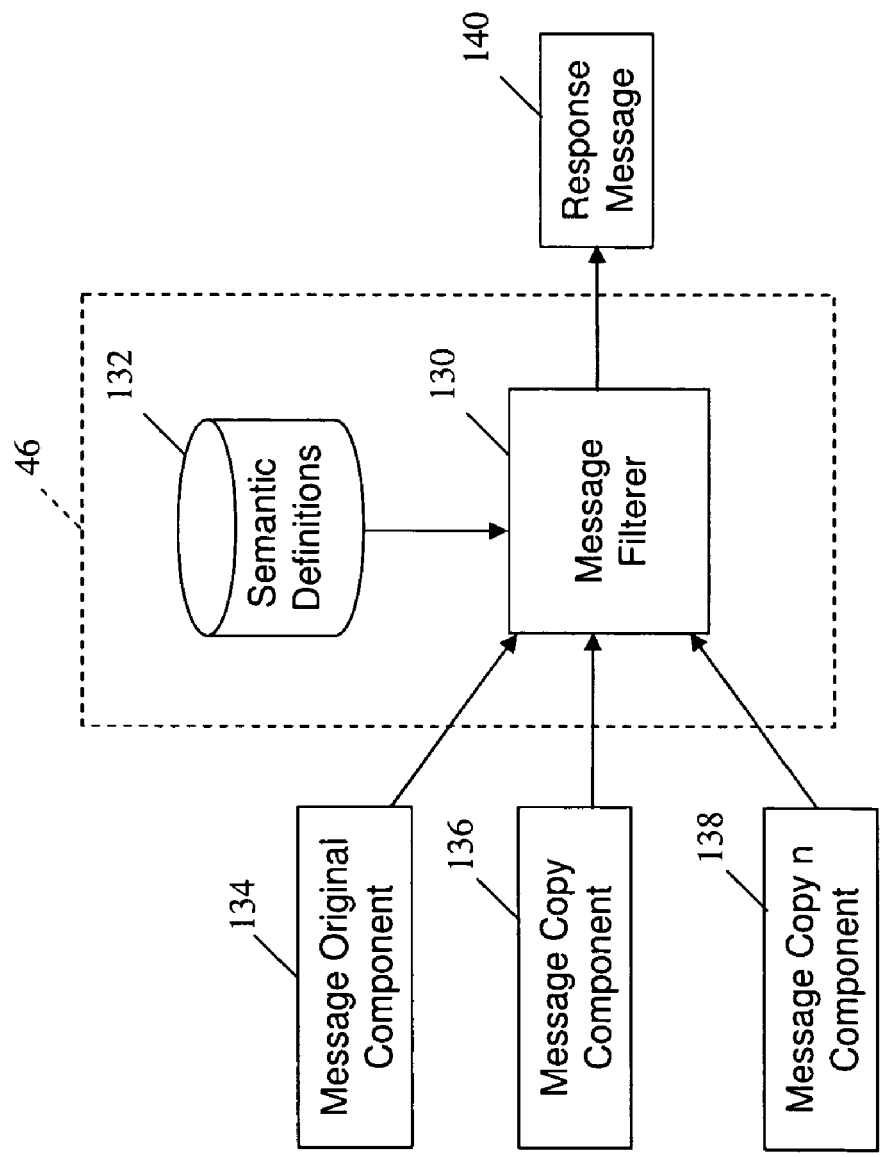
FIG. 5 is a block diagram illustrating a reply handler of the live cloning system in accordance with an exemplary embodiment.

Turning now to FIG. 5, the reply handler 46 is shown in accordance with an exemplary embodiment. The reply handler 46 includes a message filterer 130 and a semantic definitions datastore 132. In one example, the message filterer 130 is an application-independent filter. For example, the message filterer 130 compares outgoing messages 134-138 from all components 18, 28 (FIG. 1), and removes duplicate messages (provided that the messages are identical), and generates a single response message 140 to the client 34-38 (FIG. 1). If the messages 134-138 from the copies differ in some way, the message filterer 130 designates one of the original message 134 and the copy messages 136, 138 as the primary and will allow only the outgoing traffic from the primary to proceed beyond the message filterer 130.

In such a case, if the primary copy fails, the message filterer 130 either: allows the clients 34-38 (FIG. 1) to view a short service disruption by terminating open client connections and then designating a new copy as the primary; or immediately designates a new copy as a primary, and allows the clients 34-38 (FIG. 1) to temporarily see corrupted messages.

In another example, the message filterer 130 is an application-specific filter. For example, the message filterer 130 recognizes the format and semantic meaning of the messages 134-138 based on the semantic definitions stored in the semantic definitions datastore 132 and filters out semantically duplicate messages, thereby generating the single response message 140 to the client 34-38 (FIG. 1).

Figure 6:
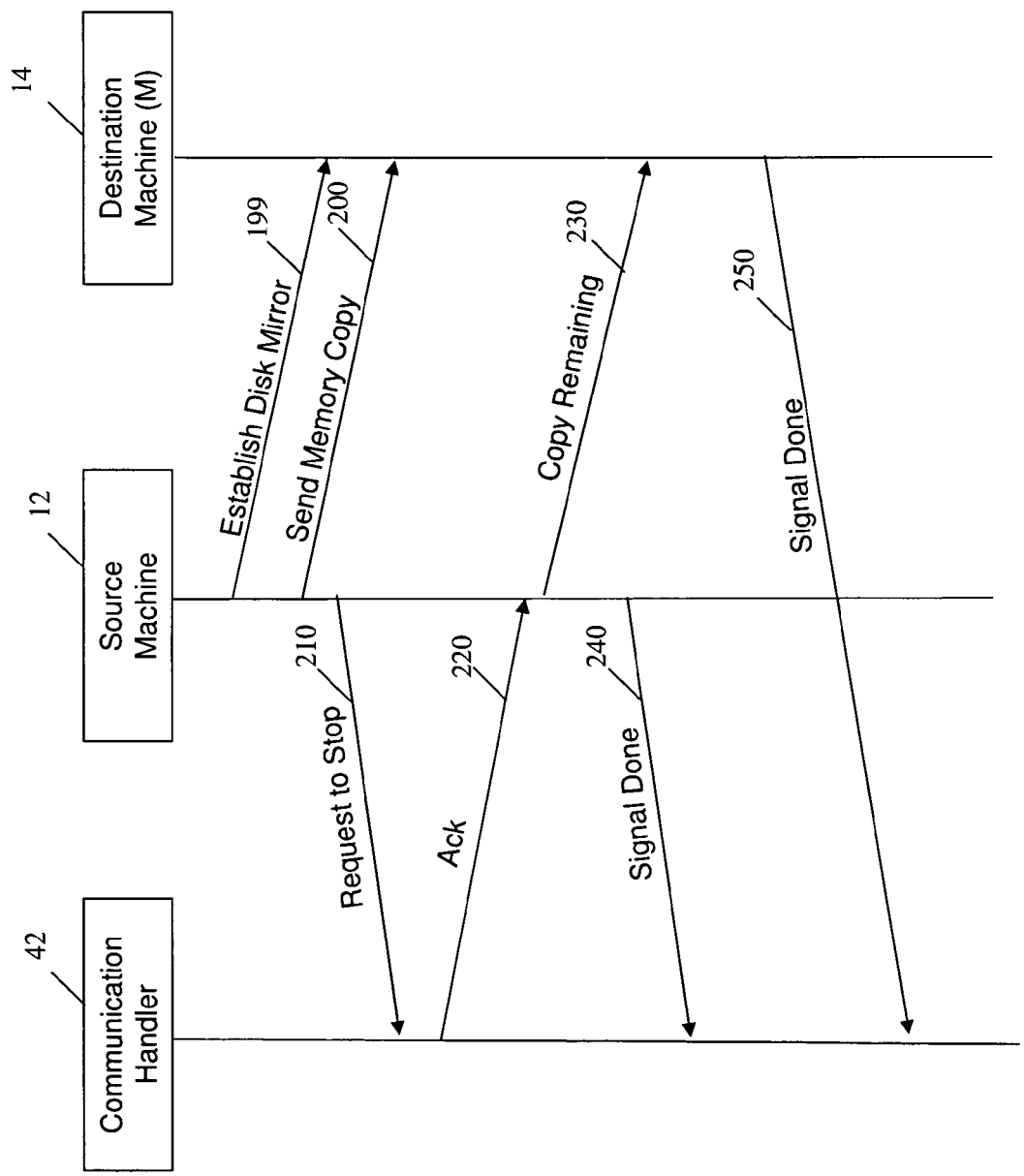
FIG. 6 is a sequence diagram illustrating a live cloning method that can be performed by the live cloning system in accordance with an exemplary embodiment.

Turning now to FIG. 6, a live cloning method is illustrated by a sequence diagram in accordance with an exemplary embodiment. As can be appreciated in light of the disclosure, the order of operation within the method is not limited to the sequential execution as illustrated in FIG. 6 and as discussed below, but may be performed in one or more varying orders as applicable and in accordance with the present disclosure.

In one example, the cloning process proceeds by first executing the steps for live cloning: X sends a full copy of the disk at sequence 199 to the machine that will host the clone (denoted M), and then iteratively sends memory pages as they get dirty at sequence 200. When the number of dirty pages remaining to be sent is less than a chosen threshold, X requests that the request handler stop forwarding network traffic to X and to create a new buffer for X's clone at sequence 210. Once the communication handler 42 acknowledges having completed this step at sequence 220, X is paused, and all of X's remaining dirty pages are sent to M at sequence 230. Once complete, X is allowed to resume operation, signaling the communication handler 42 that it is ready and waiting for data at sequence 240.

Machine M follows its own side of the protocol for live cloning: it creates the new clone (denoted Y) and receives pages from X as they become dirty. Once M has received all remaining dirty pages from X, Y is assigned a new external network representation and begins operation, so that Y will also continue waiting for data to arrive from the request handler. Once Y is running, M will notify the request handler, which will then allow X and Y to resume handling requests at sequence 250.

As described above, the address mapper 24, 32 (FIG. 1), allows X and Y to exist on the same network 16 (FIG. 1) without modification to the networking protocol. In the example of FIG. 6, when the network representations are IP addresses, consider X as using address 1.1.1.1. After cloning, Y would also internally use address 1.1.1.1. To make X and Y appear as separate components, machine M assigns Y a separate external representation (e.g. address 1.2.3.4), and the communication handler 42 forwards all incoming traffic to both addresses 1.1.1.1 and 1.2.3.4, allowing the address mapper 32 (FIG. 1) at M to internally modify network traffic to use 1.1.1.1 as the address.

In this example, the application observes only minimal interruption of service; component X is paused only for a short time during which its remaining dirty pages are copied to the destination node and the request handler is signaled.

The capabilities of the present invention can be implemented in software, firmware, hardware or some combination thereof As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for cloning a running component from a first machine to a second machine, the method comprising:

iteratively copying a state of the running component from the first machine to the second machine to generate a copy of the running component on the second machine;

assigning the copy of the running component on the second machine an external address that is distinct from an internal address of the running component; and mapping communications to and from the copy of the running component based on the distinct external address and the internal address;

intercepting incoming communications to the first machine;

replicating the incoming communications;

generating the replicated incoming communications to the second machine;

intercepting outgoing communications from the first machine and the second machine; and filtering out duplicate, outgoing communications that are similar based on a prioritizing scheme.

2. A method for cloning a running component from a first machine to a second machine, the method comprising:

iteratively copying a state of the running component from the first machine to the second machine to generate a copy of the running component on the second machine;

assigning the copy of the running component on the second machine an external address that is distinct from an internal address of the running component; and mapping communications to and from the copy of the running component based on the distinct external address and the internal address;

intercepting incoming communications to the first machine;

replicating the incoming communications;

generating the replicated incoming communications to the second machine;

intercepting outgoing communications from the first machine and the second machine; and filtering out duplicate, outgoing communications that are similar based on semantic definitions of the outgoing communications.

* * * * *